(12) United States Patent
Sahni et al.

(10) Patent No.: US 11,170,418 B1
(45) Date of Patent: Nov. 9, 2021

(54) COMPUTER IMPLEMENTED METHOD AND SYSTEMS FOR TESTING AND PURCHASE OF GOODS

(71) Applicant: Wells Fargo Bank, N.A., San Francisco, CA (US)

(72) Inventors: Bipin M. Sahni, Pleasanton, CA (US); Balinder Mangat, Castro Valley, CA (US); David Hatch, Daly City, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 68 days.

(21) Appl. No.: 16/530,354

(22) Filed: Aug. 2, 2019

Related U.S. Application Data

(63) Continuation of application No. 14/629,170, filed on Feb. 23, 2015, now Pat. No. 10,373,222.

(51) Int. Cl.
*G06Q 30/00* (2012.01)
*G06Q 30/06* (2012.01)
*G06Q 40/02* (2012.01)

(52) U.S. Cl.
CPC ......... *G06Q 30/0609* (2013.01); *G06Q 40/02* (2013.01)

(58) Field of Classification Search
CPC ..... G07C 9/00174; G06F 1/189; G06F 1/206; G06F 3/044; G06F 21/32; G06F 2221/2111; G06F 1/14; G06F 21/31; G06F 21/35; G06F 21/44; G06F 21/45; G06F 21/6218; G06F 3/0412; G06F 9/541; G06Q 30/0601–0645; G06Q 10/083; G06Q 10/04; G06Q 10/063114; G06Q 10/06375; G06Q 10/06398; G06Q 10/0836; G06Q 10/10; G06Q 10/105; G06Q 50/265;
(Continued)

(56) References Cited

U.S. PATENT DOCUMENTS

| 6,014,650 A | 1/2000 | Zampese |
| 8,425,336 B2 | 4/2013 | Munzlinger |

(Continued)

FOREIGN PATENT DOCUMENTS

WO    WO-02/10961 A2    2/2002

OTHER PUBLICATIONS

"Kwikset(R) Kevo's Latest Upgrade Introduces Free, Unlimited Guest eKeys and More Access Control: Home Access Management Becomes Even More Convenient for Current and Future Kevo Owners." PR Newswire Jul. 24, 2014: n/a. ProQuest. Jul. 1, 2021 . (Year: 2014).*

(Continued)

*Primary Examiner* — Resha Desai
*Assistant Examiner* — Kennedy Gibson-Wynn
(74) *Attorney, Agent, or Firm* — Foley & Lardner LLP

(57) ABSTRACT

Systems and methods for processing customer requests to access purchasable items using financial assessments are described. A customer using a mobile device can identify a good of interest and transmit a request to access and test it. A financial institution computing system with a database of customer financial information can generate a financial assessment of the customer and the customer's identified good, which can then be used to determine whether the customer's request should be granted.

21 Claims, 9 Drawing Sheets

(58) Field of Classification Search
CPC .......... G06Q 10/0832; G06Q 10/0833; G06Q 10/0838; G06Q 10/08355; G06Q 10/087; G06Q 30/02; G06Q 30/0281; G06Q 50/01; G06Q 50/28; G06Q 50/32
See application file for complete search history.

(56) References Cited

U.S. PATENT DOCUMENTS

| | | | |
|---|---|---|---|
| 8,438,111 | B2 | 5/2013 | Driessen |
| 8,601,266 | B2 | 12/2013 | Aabye et al. |
| 8,646,063 | B2 | 2/2014 | Dowlatkhah |
| 8,751,316 | B1 | 6/2014 | Fletchall et al. |
| 8,799,150 | B2 | 8/2014 | Annappindi |
| 9,189,900 | B1 * | 11/2015 | Penilla ............... G07C 9/00007 |
| 2008/0208753 | A1 | 8/2008 | Lee et al. |
| 2010/0010901 | A1 | 1/2010 | Marshall et al. |
| 2011/0191221 | A1 | 8/2011 | Kubert et al. |
| 2011/0213709 | A1 | 9/2011 | Newman et al. |
| 2012/0143767 | A1 | 6/2012 | Abadir |
| 2013/0117137 | A1 | 5/2013 | Klein et al. |
| 2013/0317693 | A1 * | 11/2013 | Jefferies ................. G07B 15/00 701/31.5 |
| 2014/0156392 | A1 | 6/2014 | Ouimet et al. |
| 2014/0172609 | A1 | 6/2014 | Dupoteau |
| 2014/0180940 | A1 | 6/2014 | He |
| 2014/0200935 | A1 | 7/2014 | Davies et al. |
| 2014/0239066 | A1 | 8/2014 | Dessert et al. |
| 2015/0039490 | A1 * | 2/2015 | Forrester .............. G06Q 40/025 705/38 |
| 2015/0298653 | A1 * | 10/2015 | Schwartz .............. B60R 25/003 701/2 |
| 2016/0180420 | A1 * | 6/2016 | Gamel, Jr. ......... G06Q 30/0609 705/26.35 |

OTHER PUBLICATIONS

Deal Pack, "What is a Starter Interrupt Device?" Jun. 27, 2012. https://www.dealpack.com/what-is-a-starter-interrupt-device/ (Year: 2012) 2 pages.

Greenleaf et al., Reasons for Substantial Delay in Consumer Decision Making, Journal of Consumer Research, 1995, vol. 22, issue 2, pp. 186-199.

Hamblin et al., An effective approach for utilities and suppliers to assess the quality of new products before purchase, Ninth International Conference on Metering and Tariffs for Energy Supply (Conf. Publ No. 462), 160-4, 1999, 5 pages.

Lienert, Volvo Testing Mobile Deliveries to Your Car, Edmunds. com, Feb. 20, 2014, 1 page as printed.

Reischach et al., A Mobile Product Recommendation System Interacting with Tagged Products, Pervasive Computing and Communications, 2009. PerCom 2009. IEEE International Conference, Mar. 2009, 6 pages.

* cited by examiner

COMPUTER IMPLEMENTED METHOD AND SYSTEMS FOR TESTING AND PURCHASE OF GOODS

CROSS-REFERENCE TO RELATED PATENT APPLICATIONS

This application is a continuation of and claims priority to U.S. patent application Ser. No. 14/629,170, filed on Feb. 23, 2015, and entitled "On-Demand Financial Assessment for Testing and Purchase of Goods," which is incorporated herein by reference in its entirety and for all purposes.

FIELD

The present disclosure generally relates to internet-based testing and purchasing of consumer goods and property.

BACKGROUND

Consumers in the market for large, immovable, expensive, or complex items often visit brick and mortar seller establishments to view, access, test, and purchase those items. This is particularly true of goods and property that often need to be financed, and/or goods and property with security measures restricting consumer access and/or consumer use, such as automobiles and houses. In these cases, a consumer is usually required to coordinate with the seller or other third party individuals that are capable of providing access to or use of the good or property of interest, or are capable of providing financing to facilitate a purchase.

SUMMARY

One embodiment of the invention relates to a computing system. The system includes a network interface logic, a customer database, and an assessment logic. The network interface logic is configured to access and exchange data over a network. The customer database is configured to include personal and financial information associated with a plurality of customers. The assessment logic is configured to provide a mobile application configured to exchange data from a mobile device and a financial institution computing system. The assessment logic is further configured to receive a customer request to gain access to an item, the request being received through the network interface logic. The assessment logic is configured to access information in the customer database. The assessment logic is further configured to generate a financial assessment based on the information in the customer database. The assessment logic is configured to transmit the financial assessment through the network interface logic, wherein whether the customer gains access to the item is determined based on the results of the financial assessment.

Another embodiment of the invention relates to a computer-implemented method. The method includes maintaining, by an assessment logic, a customer database comprising personal and financial information associated with a plurality of customers. The method further includes providing, by an assessment logic, a mobile application configured to exchange data from a mobile device and a financial institution computing system. The method includes receiving, by a network interface logic, a customer request to gain access to an item. The method further includes accessing, by an assessment logic, information on the customer database. The method includes generating, by an assessment logic, a financial assessment. The method further includes transmitting, by an assessment logic, the financial assessment, wherein whether the customer gains access to the item is determined based on the results of the financial assessment.

Yet another embodiment of the invention relates to a non-transitory computer readable media having computer-executable instructions embodied therein that, when executed by at least one processor of a computing system, cause the computing system to perform operations to process requests received from customer mobile devices. The operations include maintaining a customer database comprising personal and financial information associated with a plurality of customers. The operations further include providing a mobile application to a customer, the mobile application being configured to exchange data from a mobile device and a financial institution computing system. The operations include receiving a customer request to gain access to an item, the request being received through the network interface logic. The operations further include accessing information in the customer database. The operations include generating a financial assessment based on the information in the customer database. The operations further include transmitting the financial assessment through the network interface logic, wherein whether the customer gains access to the item is determined based on the results of the financial assessment.

DETAILED DESCRIPTION

Referring to the figures generally, systems and methods for testing and purchasing internet-enabled goods (or "items") are described. (Herein, the terms "goods" and "items" are used interchangeably.) Internet-enabled goods are consumer-purchasable property with security measures that can be remotely disabled. These goods include, by way of example, real estate (e.g., residential property, commercial property, storage spaces, and so on), vehicles (e.g., cars, trucks, carts, tractors, boats, and so on), and so on. The system allows a given customer to use a mobile application to identify a testable good of interest, and request permission to test it. The customer's personal information (e.g., financial information such as account balances, deficiencies, credit assessments, and so on) and information regarding the testable good of interest (e.g., price, availability, location, and so on) is used to approve or deny the customer's request. If the customer's request is approved, the mobile application can ultimately grant the customer the ability to test the testable good of interest. Once the customer finishes testing the testable good of interest, the mobile application can provide the customer with available purchasing and (if applicable) financing options to grant the customer ownership of the tested good. If the customer decides to move forward with purchasing the tested good, the mobile application causes a financial transaction to occur and causes ownership and/or a right of possession of the tested good to shift to the customer.

Figure 1A:
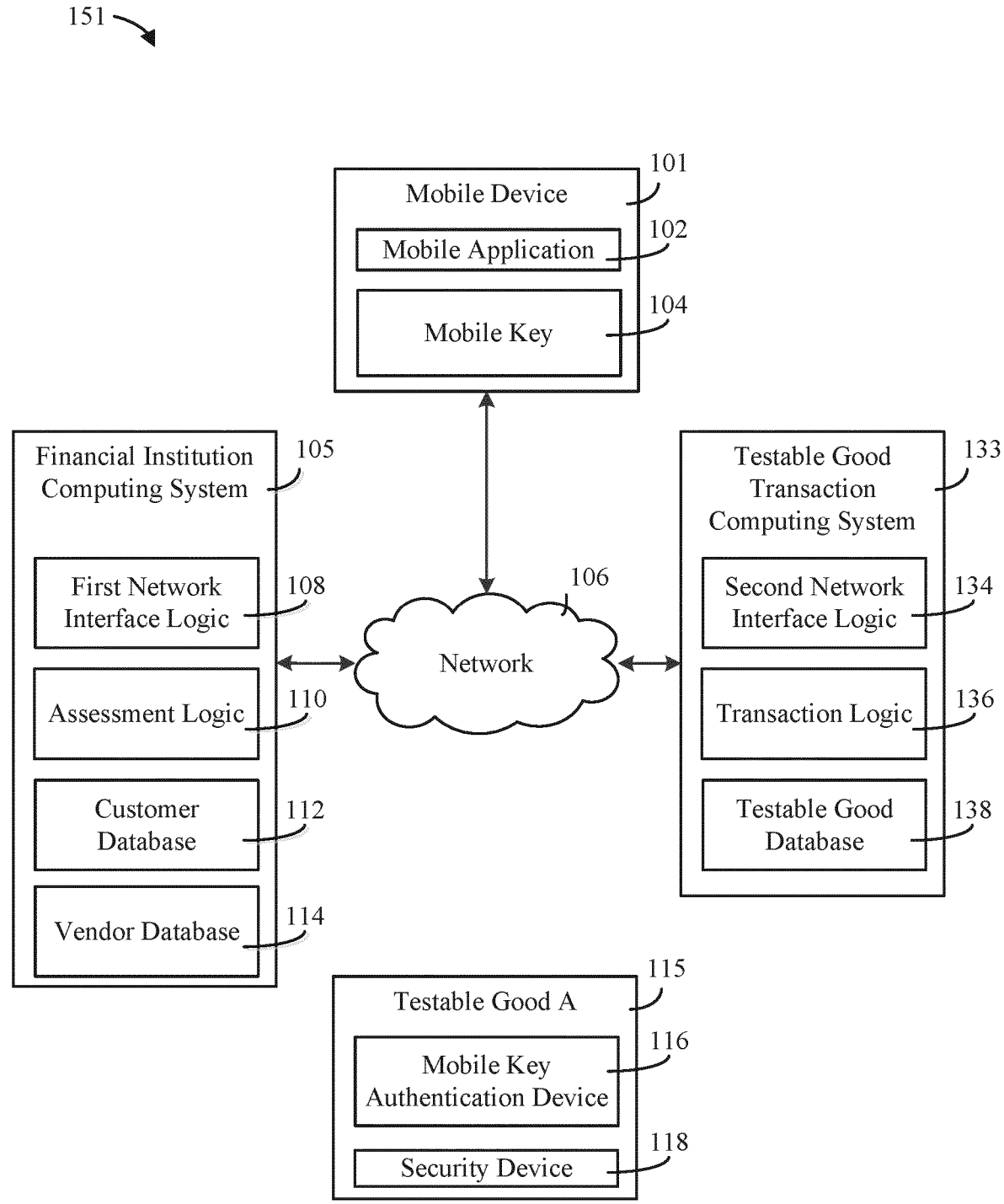
FIG. 1A is a schematic diagram of a computer-implemented customer testing request and purchasing request processing system according to an example embodiment.

Referring now to FIG. 1A, a schematic diagram of a computer-implemented system 151 of testing internet-enabled goods is shown according to one example embodiment. The system 151 includes a mobile device 101, a financial institution computing system 105, a testable good transaction computing system 133, and a testable good A 115. The system 151 allows a customer to try out and ultimately purchase testable good A 115. The relationships between the various aspects of system 151 are described in further detail below.

Still referring to FIG. 1A, the system 151 includes at least one mobile device 101. Examples of a mobile device 101 may include, for example, mobile phones, smartphones, tablets, wearable computing devices (e.g., eyewear), laptop computers, and so on. A common feature of the mobile device 101 is the ability to access a network 106 in order to send and receive data to and from a financial institution computing system 105, including testing requests. The network 106 may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 106 includes the internet.

The mobile device 101 includes at least one mobile application 102. Mobile applications 102 are software programs provided by a customer's financial institution and installed on the mobile device 101, and are configured to cause the mobile device to exchange data over a network 106. The mobile applications 102 also provide a user interface that allows customers to search for testable goods. In some arrangements, a customer can use the mobile application 102 to identify a desired testable good (e.g., testable good A), after which the mobile application 102 can send a testing request over the network 106 to a financial institution computing system 105. In some arrangements, updates or plugins with product databases associated with individual vendors can be downloaded by the mobile device 101 and incorporated into the mobile application 102.

The mobile application 102 or mobile circuit may include program logic executable by mobile device 101 to implement at least some of the functions described herein. In order to make the mobile circuit 102, the financial institution computing system 105 may provide a software application and make the software application available to be placed on the mobile device 101. For example, the financial institution computing system 105 may make the software application available to be downloaded (e.g., via the online banking website of the bank, via an app store, or in another manner). Responsive to a user selection of an appropriate link, the application may be transmitted to the mobile device 101 and may cause itself to be installed on the mobile device 101. Installation of the software application creates the mobile circuit 102 on the mobile device 101. Specifically, after installation, the thus-modified mobile device 101 includes the mobile circuit 102 (embodied as a processor and instructions stored in non-transitory memory that are executed by the processor).

Still referring to FIG. 1A, the system 151 includes the financial institution computing system 105. The financial institution computing system 105 is a computing system at a financial institution that manages customer accounts and facilitates customer purchases of testable goods. The financial institution is a banking entity capable of maintaining customer financial accounts and facilitating customer purchases (e.g., by transferring funds from the customer's account, or preparing and dispensing new loans for the customer, and so on). The financial institution may be a commercial or private bank, a credit union, or an investment brokerage. Customers may be business entities and/or individual persons having one or more accounts with the financial institution. The financial institution computing system 105 includes a first network interface logic 108, an assessment logic 110, a customer database 112, and a vendor database 114. The first network interface logic 108 allows the financial institution computing system 105 to exchange data with customer mobile devices 101 and a testable good transaction computing system 133 over a network 106.

Information in the customer database 112 is used to determine whether a given customer is capable of purchasing, or likely to purchase, a given testable good. The customer database 112 contains information for a plurality of customers, including for example, personal customer information (e.g., names, addresses, phone numbers, and so on) and customers' financial information (e.g., associated financial institutions, account numbers, account balances, credit assessments, and so on). The information contained in the customer database 112 is sufficient for the financial institution computing system 105 to perform a variety of checks on a given customer, including for example, credit checks and credit assessments, background checks, determining whether the customer may be eligible for applicable loans and determining loan terms available to the customer, and so on.

The assessment logic 110 interfaces with the network interface logic 108, the customer database 112, and the vendor database 114. The assessment logic 110 uses information received over the network 106 via the first network interface logic 108 and the information stored in the customer database 112 and the vendor database 114 to determine whether a customer is capable of purchasing an identified testable good, and/or whether the customer is likely to purchase an identified testable good. Upon receiving a customer testing request sent by a mobile application 102, the assessment logic 110 is configured to pull information relating to the customer from the customer database 112, and information relating to the vendor associated with the identified testable good from the vendor database 114. The assessment logic 110 runs a series of checks and analyses as set out by the vendor's preferences in the vendor database 114 or the financial institution's default set of criteria (as discussed with respect to the vendor database 114, below) to produce a financial assessment. The financial assessment is the result of the financial institution's checks and analyses as to the customer's personal and financial information available to the financial institution computing system. The financial assessment can include, for example, a summary as to the customer's credit, spending habits, debt load, and so on. In some arrangements, the financial assessment includes a determination as to whether, in light of the customer's personal and financial information, the customer will be able/is likely to purchase the testable good.

For example, if the customer is at an automobile dealership, and is seeking to test drive an automobile that sells for $30,000, the assessment logic may perform an assessment to determine whether the customer could be approved for a $30,000 loan. If the customer could be approved for a $30,000 loan, then the assessment logic 110 may respond with an affirmative answer, otherwise, it may respond with a negative answer. In some embodiments, further information may be taken into account in order to assess whether the customer is seriously considering a purchase, or whether the customer is merely "window shopping." For example, if the customer seeks to enter a house that is for sale, but has not been preapproved for a loan in an amount to cover the sale price of the home, then a determination may be made that the customer is not sufficiently serious to permit the customer to gain access to the home without the presence of a real estate agent. As another example, the assessment logic 110 may consider information as to whether the customer has purchased similar products in the past. For example, if the customer is seeking to test drive an antique automobile, in addition to checking whether the customer could be approved for a loan in an amount to cover the purchase price of the automobile, the assessment logic 110 may further perform a check of DMV records to ascertain whether the customer has purchased other antique automobiles in the past. If the customer has not purchased other antique automobiles, then the assessment logic 110 may return a negative answer, such that sales personnel at the dealership may speak with the customer before permitting the customer to take the antique automobile for a test drive. As another example, the assessment logic 110 may consider information regarding spending habits of the customer. For example, segmenting operations may be performed to segment into various categories based on their interests as determined based on their spending habits. For example, the customer may be placed into an "outdoors person" customer segment, based on a history of purchases of outdoor sporting goods (e.g., camping supplies, ski equipment, fishing equipment, and so on). If the customer seeks to take a recreational vehicle (RV) for a test drive, the assessment logic 110 may generate an affirmative response based both on the fact that the customer could be approved for a loan in an amount sufficient to cover the purchase price of the RV and based on the fact that the customer has been placed in the "outdoors person" segment. As another example, the assessment logic 110 may perform a criminal background check and generate a response based on the results of the criminal background check. For example, if the customer has criminal record that includes a larceny conviction within the past 5 years, the assessment logic 110 may return a negative response. The assessment logic 110 can be configured to send the financial assessment and the customer's testing request to a testable good transaction computing system 133 over the network 106 via the first network interface logic 108 upon completing the financial assessment.

The assessment logic 110 is further configured to prepare at least one transaction package that involves a sum of funds sufficient to purchase the testable good identified in the customer's testing request. The transaction package can include, for example, a designated sum of funds immediately available in the customer's checking account at the financial institution (e.g., if the customer has sufficient cash on hand to pay for the purchase). As another example, the transaction package can include a designated sum of loan funds from a lender (e.g., the financial institution itself, or a third party lender) along with information relating to the terms of the loan. Upon receiving a confirmation indicating that a customer wishes to purchase a testable good after testing it, the assessment logic 110 can be configured to cause the transaction package to be transferred to the vendor associated with the testable good. In some arrangements, the assessment logic 110 prepares multiple transaction packages, and transmits information summarizing each transaction package to the customer for selection and approval. The assessment logic 110 can then transmit the customer's selected transaction package to the testable good transaction computing system 133.

The vendor database 114 includes information relating to a plurality of vendors (e.g., sellers or owners of testable products such as testable product A). The information contained in the vendor database 114 can include, for example, a set of minimum testing requirements (e.g., a minimum credit score, a clear criminal background check, a minimum checking account balance, a minimum amount of available credit, a preapproved loan for a minimum amount, or the like). In some arrangements, the information in the vendor database 114 is pre-stored in advance of a customer sending a testing request. In other arrangements, the information in the vendor database 114 is obtained on a live, case-by-case basis. Further, one or more vendors can be categorized under a common set of testing qualifications (e.g., a financial institution's base set testing eligibility criteria, which can be applied by default unless a given vendor provides specific criteria).

Still referring to FIG. 1A, the system 151 includes the testable good transaction computing system 133. The testable good transaction computing system 133 is a computing system associated with a given vendor of testable goods that maintains databases of information relating to a plurality of testable goods, and allows customers to take possession or ownership of the testable goods. The testable good transaction computing system 133 includes a second network interface logic 134, a transaction logic 136, and a testable good database 138. Like the first network interface logic 108, the second network interface logic 134 enables the testable good transaction computing system 133 to exchange data over the network 106.

The testable good database 138 is a database of information relating to a plurality of testable goods (e.g., testable good A). The information in the testable good database 138 includes, for example, each of the testable goods' locations, identifying information (e.g., addresses, and/or makes and models, etc.), prices, availabilities, and so on. The testable good database 138 also includes information relating to at least one mobile key 104 that is associated with a testable good. A mobile key 104 is a unique code that enables customers to access and/or use the customer's identified testable good. In some arrangements, the mobile key is a sequence of letters or numbers that is made available to an approved customer. In other arrangements, the mobile key 104 is a digital code that specifically identifies the customer's mobile device 101 (e.g., a digital code that can be communicated via Bluetooth™, near-field communication ("NFC"), wireless data networks, and so on). The testable good database 138 can further include information relating to minimum testing criteria to be assessed by a financial institution computing system 105 for a given testing request. In some arrangements, the minimum testing criteria is uniform across all of a given vendor's testable goods. In other arrangements, the minimum testing criteria varies across a given vendor's individual testable goods.

The transaction logic 136 interfaces with the second network interface logic 134 and the testable good database 138 to determine whether a given customer testing request should be approved, and enables a customer to access, test, and ultimately purchase a given testable good. Upon receiving a customer testing request and the financial assessment from the financial institution computing system 105, the transaction logic 136 is configured to pull information relating to the testable good identified in the testing request from the testable good database 138 to determine whether the customer testing request should be granted. In some arrangements, the transaction logic 136 is configured to deny the customer testing request if the financial assessment falls beneath a set of minimum standards as determined by the respective vendor of the testable good. In other arrangements, the transaction logic 136 is configured to approve the customer testing request even if the financial assessment falls beneath the vendor's minimum standards.

If the transaction logic 136 approves a customer testing request, the transaction logic 136 causes a mobile key 104 associated with the identified testable good to be transferred and/or enabled in the mobile device 101 associated with the requesting customer. In some arrangements, the transaction logic 136 transmits a mobile key 104 to the mobile device 101 directly over the network 106 via the second network interface logic 134. In other arrangements, the transaction logic 136 transmits a mobile key 104 to the financial institution computing system 105, which in turn transfers the mobile key 104 and a notice of approval to the customer's mobile device 101. In some embodiments, providing the mobile key 104 to the customer, and requiring the customer to utilize the mobile key 104 to gain access to the testable good, helps ensure that the person that is granted access to the testable good and the person that actually gains access to the testable good are the same person. In other embodiments, the mobile key 104 does not pass through the customer, and the customer is able to gain access to the testable good without further action on the part of the customer once the assessment logic 110 transmits an affirmative response.

The transaction logic 136 is further configured to receive and process a transaction package from a financial institution computing system 105. Upon receiving a transaction package, the transaction logic 136 is configured to cause a right of ownership and/or possession of the corresponding testable good to transfer to the corresponding customer. This can include, for example, providing a set of title documents, keys, or other items and information relating to the transfer of ownership or possession to the customer.

Still referring to FIG. 1A, the system 151 includes a testable good A 115. Testable good A 115 is any one of several consumer-purchasable goods, including, by way of example, real estate (e.g., residential property, commercial property, storage spaces, and so on), vehicles (e.g., cars, trucks, carts, tractors, boats, and so on), and so on. Testable good A 115 includes a mobile key authentication device 116. A mobile key authentication device 116 is a device configured to recognize a mobile key 104. In some arrangements (e.g., where the mobile key 104 is an alphanumeric code), the mobile key authentication device 116 is an alphanumeric keypad. In other arrangements a local wireless data transmission is used, for example, the mobile key authentication device 116 can be a NFC device configured to recognize a mobile key 104 transmitted via a NFC transmission by the mobile device 101. In other arrangements using a local wireless data transmission, the mobile key authentication device 116 is a Bluetooth™ enabled communicator configured to recognize the mobile key 104 in a Bluetooth™-enabled mobile device 101. Other arrangements are possible.

The testable good A 115 further includes a security device 118. The security device 118 is a mechanism for restricting use or access to the underlying testable good. In some arrangements, the security device 118 is a physical lock (e.g., a deadbolt, a locked door, a gate, or the like). In other arrangements, the security device 118 is a software program that prevents the underlying good from operating (e.g., by disabling power, by restricting user access to an underlying program, etc.). In other embodiments, the security device 118 is an electronic security system or an electronically-controlled lock. The security device 118 is configured to be disabled by the first mobile key authentication device 116 after the mobile key authentication device recognizes a mobile key 104.

According to an example embodiment of system 151, in operation, a customer downloads and installs a mobile application 102 associated with the customer's financial institution. The customer identifies a testable good of interest via the mobile application 102, and transmits a testing request to the financial institution computing system 105. The first network interface logic 108 in the financial institution computing system 105 receives the testing request from the network 106 and routes the testing request to the assessment logic 110. The assessment logic 110 then looks up the customer's information from the customer database 112 and looks up the identified testable good's information from the vendor database 114. The assessment logic 110 runs a series of checks and processes and generates a financial assessment of the customer based on the criteria specified in the vendor database 114 and the customer's information in the customer database 112. The assessment logic 110 then transmits the customer testing request and the financial assessment to the testable good transaction computing system 133 over the network 106.

The transaction logic 136 receives the financial assessment and customer testing request from the financial institution computing system 105 from the network 106, and decides whether to approve the customer's testing request, based on the contents of the financial assessment. If the transaction logic 136 determines that the customer is sufficiently trustworthy and/or capable of ultimately purchasing the requested testable good, the transaction logic 136 enables a mobile key 104 associated with the customer's mobile device 101 and the identified testable good (e.g., testable good A). In some arrangements, the mobile key 104 is an alphanumeric code sent to the customer's mobile device 101 (e.g., via SMS message, e-mail, a notification in the mobile application 102, or the like) by the transaction logic 136. In other arrangements, the mobile key 104 is a digital code sent to the customer's mobile device 101 that can later be wirelessly transmitted (e.g., via Bluetooth™, NFC, wireless data networks, and so on). In yet other arrangements, the mobile key 104 is a pre-installed digital code in the mobile application 102, and the transaction logic 136 activates the digital code upon approving the customer's testing request. In yet other arrangements, the mobile key 104 is directly transmitted to the mobile key authentication device 116 from the testable good transaction computing system 133, which disables a security device (e.g., security device 118) associated with the testable good (e.g., for a car, disabling a kill switch, thereby allowing the car to start up). As shown, a wide variety of arrangements are possible.

After the transaction logic 136 enables and/or transmits a mobile key 104, the customer can access and test testable good A 115. According to various embodiments, the customer can cause the mobile key authentication device 116 to recognize the mobile key 104 (e.g., by bringing the mobile device within range of the mobile key authentication device 116's Bluetooth™ range, or the mobile key authentication device's NFC range; by entering an alphanumeric mobile key code into a keypad associated with the mobile key authentication device; or the like). Or, as discussed above, the mobile key authentication device 116 can recognize a mobile key 104 that was transmitted straight from the testable good transaction computing system 133. Once the mobile key authentication device 116 recognizes the mobile key 104, the mobile key authentication device disables the security device 118 associated with testable good A 115. The customer can then access, view, and/or otherwise test testable good A 115.

After the customer is allowed an opportunity to access, view, and/or test testable good A 115, the assessment logic 110 can transmit information relating to one or more available transaction packages to the mobile application 102 on the mobile device 101, which can then present the customer with information relating to the one or more available transaction packages (e.g., payment in full via credit card accounts or checking accounts, financing options with various terms, and so on). If the customer selects one of the available transaction packages, the mobile application 102 can collect any missing customer information or obtain any customer signatures/acknowledgements required to complete the purchase (e.g., by requiring the user to fill personal information fields presented on the mobile application 102, or by requesting information from remote accounts over the network 106), and send the information to the financial institution computing system 105 over the network 106. The financial institution computing system 105 can then execute the customer's purchase (i.e., by causing the transfer of funds to the title owner of testable good A 115, and causing the transfer of title of testable good A to the customer). The customer can then take ownership and/or possession of testable good A 115.

On the other hand, if the customer declines to purchase testable good A 115, the mobile application 102 can notify the financial institution computing system 105 or the testable good transaction computing system 133 over the network 106 that the customer's testing session has ended. The testable good transaction computing system 133 can then disable the customer's mobile key 104 and update the testable good database 138 to reflect that testable good A 115 is available for another customer to access and test it.

Figure 1B:
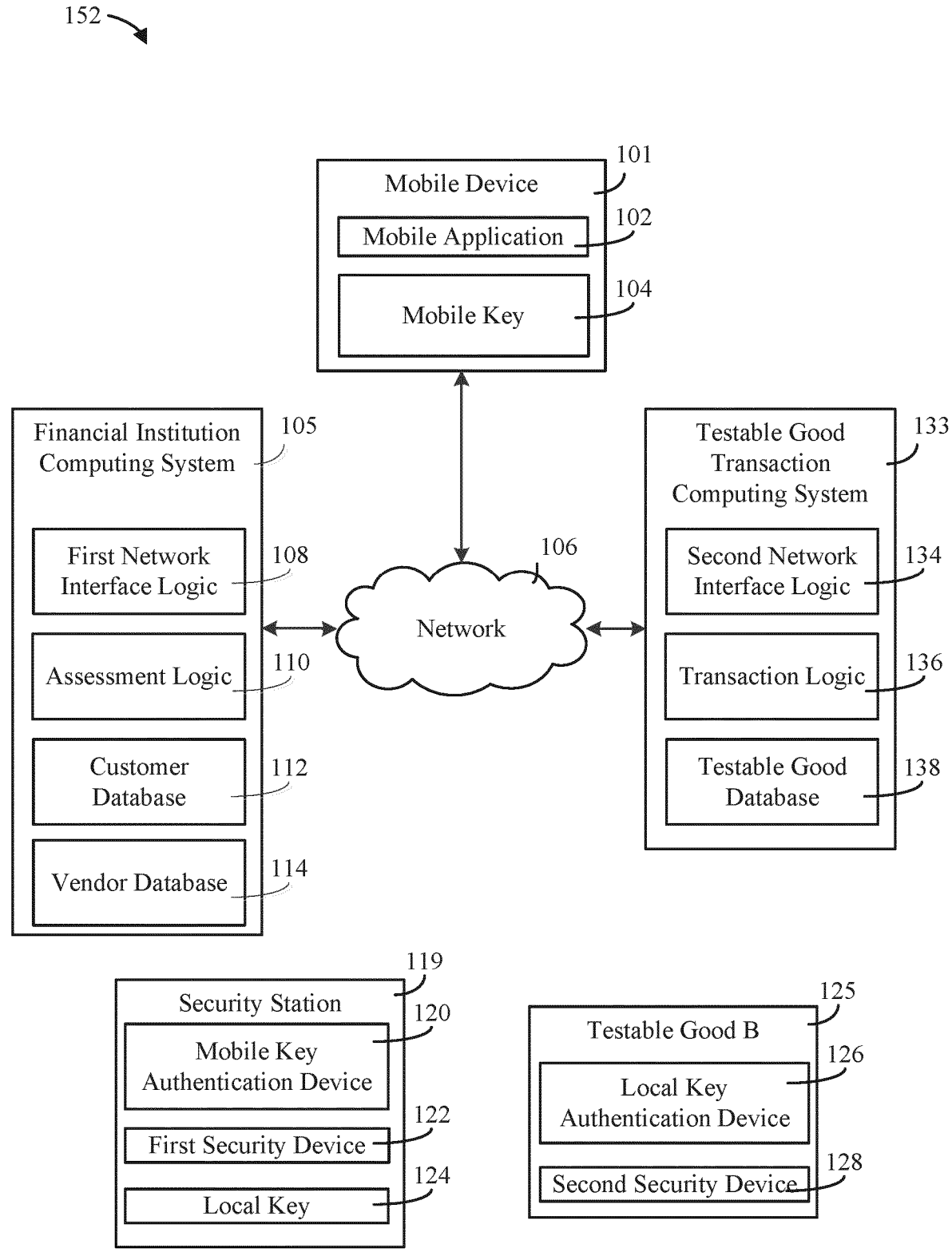
FIG. 1B is a schematic diagram of a computer-implemented customer testing request and purchasing request processing system according to another example embodiment.

Referring now to FIG. 1B, a schematic diagram of a computer-implemented system 152 of testing internet-enabled goods is shown according to another example embodiment. The system 152 includes a mobile device 101, a financial institution computing system 105, and a testable good transaction computing system 133, all as discussed with respect to FIG. 1A. FIG. 1B further includes a security station 119 and a testable good B 125. By using a system of authenticating keys, the system 152 allows a customer to try out and ultimately purchase testable good B 125. The relationships between the various aspects of system 152 are described in further detail below.

The security station 119 is a physical location where a customer can access physical items relating to a testable good, e.g., testable good B 125. A security station 119 can be, for example, a freestanding lockbox, a secured compartment attached or integrated into a testable good (e.g., a glove compartment in a car, a mailbox at a residential property, and so on), or an identifiable secured container (e.g., a lockbox at a bank). The security station 119 includes a mobile key authentication device 120, a first security device 122, and a local key 124. The mobile key authentication device 120 at the security station 119 operates in a similar manner as the mobile key authentication device 116 at testable good A 115, in that the mobile key authentication device 120 is configured to recognize a mobile key 104 and disable the first security device 122 at the security station 119. The first security device 122 at the security station 119 also operates in a similar manner as the security device 118 at testable good A 115, in that the first security device 122 disables or prevents access to a local key 124 at the security station 119. Finally, the local key 124 is a physical item associated with a testable good (e.g., capable of activating or allowing access to a testable good). In one arrangement, local key 124 is a physical set of keys (e.g., keys to a tumbler-based lock, or plastic keycards to electronic locks) that can disable another security device at a testable good. In another arrangement, local key 124 includes a set of hard copy documents relating to the right of ownership or the right to possession of a testable good (e.g., hard copy title applications, title documents, or rental agreements, or temporary possession agreements).

Testable good B 125 is another consumer-purchasable good, like testable good A 115. Testable good B 125 includes a local key authentication device 126 and a second security device 128. The local key authentication device 126 is a device configured to recognize the local key 124. In some arrangements, the local key authentication device 126 is a key slot (e.g., a key slot on a door handle, or a key slot associated with a door deadbolt lock, or a key slot associated with a vehicle starter ignition, or the like). In other arrangements, the local key authentication device 126 is an electronic key reader (e.g., a keycard slot on a door handle, or a key fob detector associated with a door or a gate, and so on). In yet other arrangements, the local key authentication device 126 is a code scanner (e.g., a bar code scanner, a quick response code scanner, or the like).

In operation, for this arrangement with a security station 119 and testable good B 125, a customer can use a mobile application 102 on a mobile device 101 to identify testable good B 125, and send a testing request to a financial institution computing system 105 over a network 106. The financial institution computing system 105 receives the testing request, generates a financial assessment, and transmits the financial assessment to a testable good transaction computing system 133 associated with testable good B 125. The transaction logic 136 can then approve the customer's testing request, and enable a mobile key 104 associated with the customer's mobile device 101. The customer may then take the mobile device 101 to the security station 119, where the mobile key 104 is recognized by the mobile key authentication device 120. The mobile key authentication device 120 disables the first security device 122, allowing the customer access to the local key 124. The customer can then take the local key 124 to testable good B 125, where the local key authentication device 126 recognizes the local key 124 and disables a second security device 128. The customer is then able to access and test testable good B 125. Upon the completion of the customer's testing, the mobile application 102 on the customer's mobile device 101 can present information relating to available transaction packages to the customer. In one arrangement, if the customer elects to purchase testable good B 125 using one of the available transaction packages, additional hard copy documents and items relating to transferring ownership of testable good B 125 can be accessed at the security station 119. If the customer declines to purchase testable good B 125, the customer can then return the local key 124 to the security station 119.

Figure 1C:
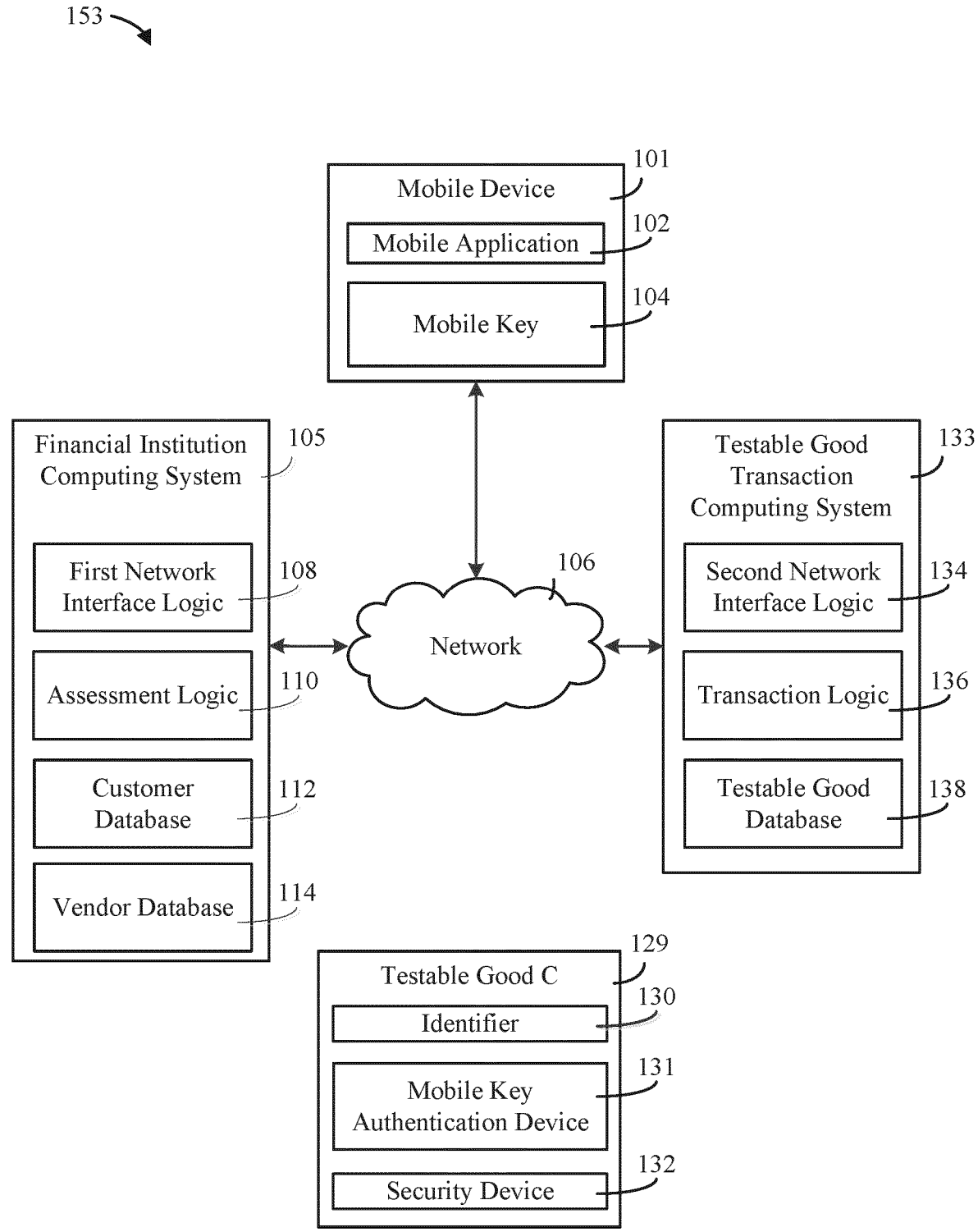
FIG. 1C is a schematic diagram of a computer-implemented customer testing request and purchasing request processing system according to yet another example embodiment.

Referring now to FIG. 1C, a schematic diagram of a computer-implemented system 153 of testing internet-enabled goods is shown according to yet another example embodiment. The system 153 includes a mobile device 101, a financial institution computing system 105, and a testable good transaction computing system 133, all as discussed with respect to FIG. 1A. FIG. 1C further includes a testable good C 129. By using a system of authenticating keys, the system 153 allows a customer to try out and ultimately purchase testable good C 129. The relationships between the various aspects of system 153 are described in further detail below.

Testable good C 129 is another consumer-purchasable good, like testable good A 115 and testable good B 125. Testable good C 129 includes an identifier 130, a mobile key authentication device 131 and a security device 132. The identifier 130 is a unique code or image that specifically identifies testable good C 129. In some arrangements, identifier 130 is an alphanumeric code that is visible to a customer in the vicinity of testable good C 129 (e.g., engraved on the good, or shown on a sticker affixed to the good, or the like). In other arrangements, identifier 130 is a bar code or a quick response ("QR") code that can be scanned by a mobile device 101. The mobile key authentication device 116 is a device configured to recognize a mobile key 104 and disengage an associated security device 118, similar to the mobile key authentication device 116 and security device 118 as discussed with respect to testable good A 115.

In operation, the identifier 130 on testable good C 129 allows customers to identify testable good C 129 in person before submitting a testing request, as opposed to identifying testable good C 129 in the mobile application 102. For example, a customer viewing a plurality of testable goods in person can come across testable good C 129, where the customer can locate and use the identifier 130 specific to testable good C 129 to prepare a testing request (e.g., by scanning the identifier 130 with a mobile device 101 if it is a bar code or a QR code, or entering a code into a mobile application 102 if the identifier 130 is an alphanumeric code). Subsequently, a financial assessment and transaction packages can be prepared by the financial institution computing system 105 (e.g., as discussed with respect to FIGS. 1A and 1B), the security device 132 associated with testable good C 129 can be disabled (e.g., via the use of a mobile key 104 and/or a local key 124, as discussed with respect to FIGS. 1A and 1B, respectively), and the customer can test and purchase testable good C 129.

Figure 2A:
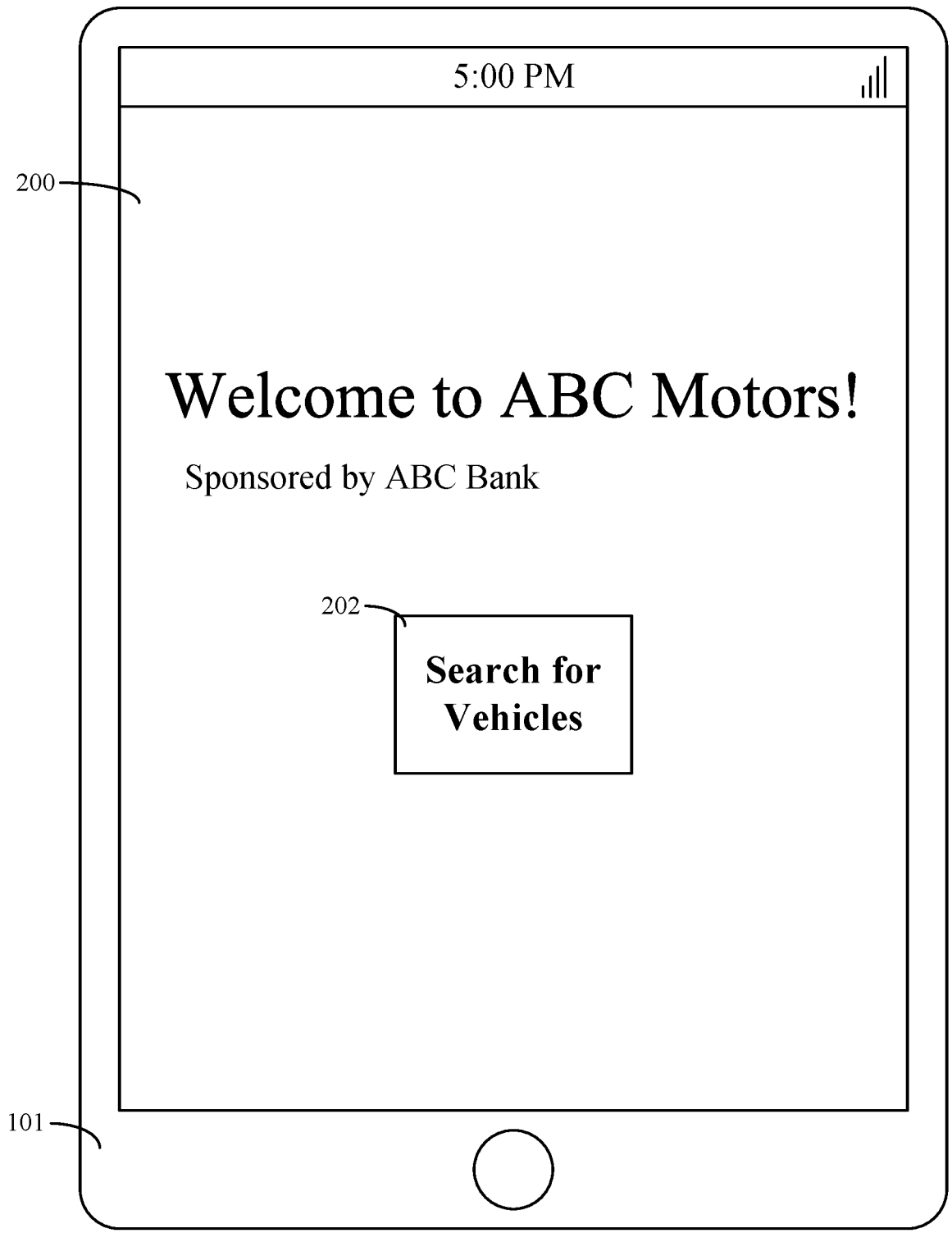
FIGS. 2A through 2E are schematic diagrams of a software-based user interface on a mobile device according to an example embodiment.

Referring now to FIG. 2A, an example interactive graphical user interface 200 of the mobile application 102 as viewed on a customer's mobile device 101 is shown according to an example embodiment. The user interface 200 in FIG. 2A initially displays a welcome screen of the mobile application 102. A customer can interact with the user interface 200 to identify testable goods, request access to test those goods, and ultimately allows the customer to purchase those goods. When a customer selects the "Search for Vehicles" button 202, the mobile application updates the user interface 200 to allow the customer to search for and identify testable goods (e.g., as shown in FIG. 2B), which here in this example embodiment, are motor vehicles.

Figure 2B:
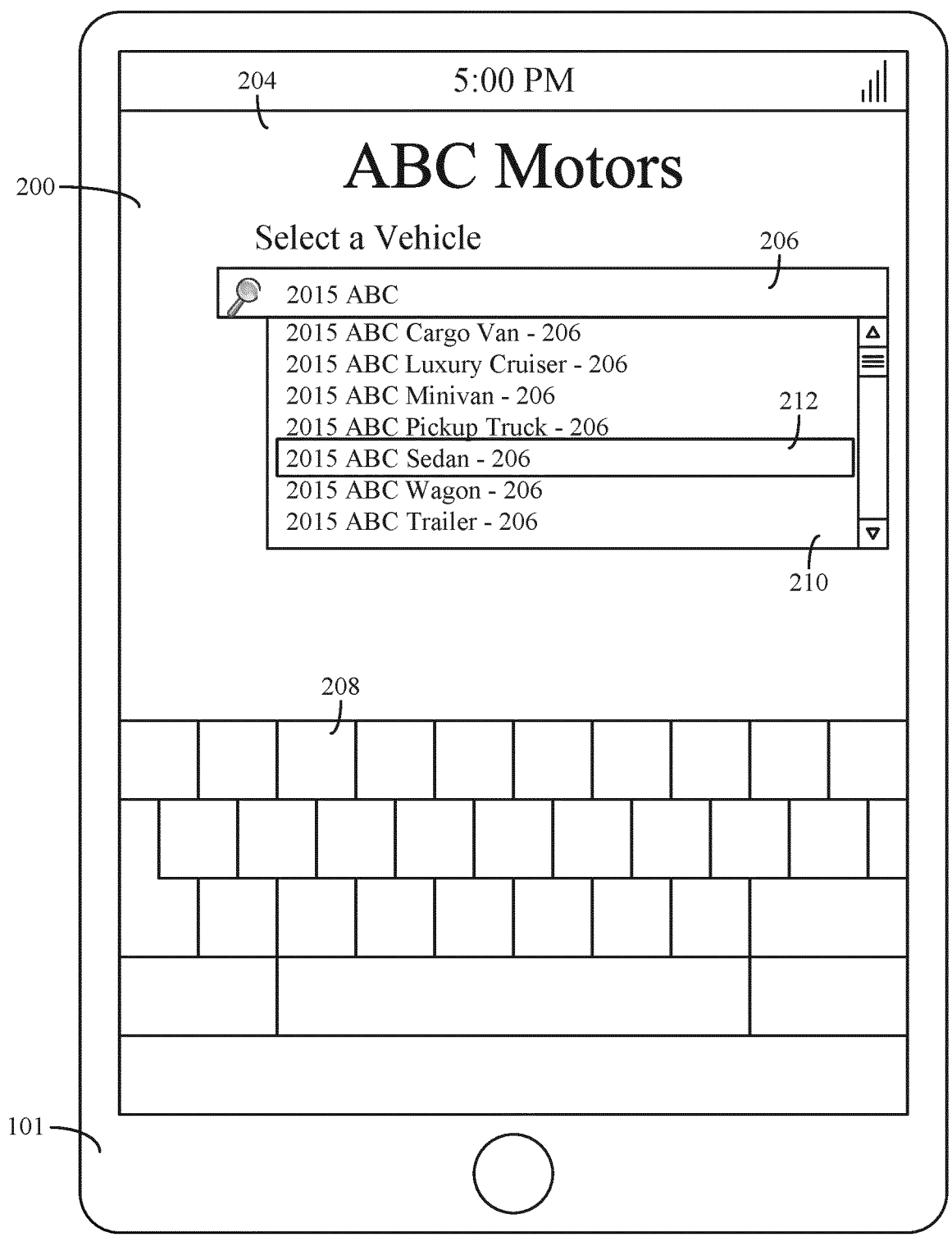

Referring now to FIG. 2B, the user interface 200 of FIG. 2A has been updated after the customer interacted with the "Search for Vehicles" button 202 to a "Select a Vehicle" page 204. Through the user interface 200, a customer can begin providing vehicle information (e.g., a vehicle's year, make, and model, or desired features and so on) to the mobile application 102. As shown in FIG. 2B, the customer can start typing an intended testable good into a search query box 206 by interacting with the user interface (e.g., by typing on a keyboard 208 of the mobile device 101). As the customer enters information relating to the desired vehicle, a drop-down list of potential vehicles of interest 210 appears. The customer may also be provided with the ability to specify vehicle options (e.g., color, engine size, and so on), and the system may return a list of vehicles that meet the specified criteria and are available for testing. The customer can then identify and select a desired vehicle 212, which will cause a testing request to be sent to a financial institution computing system 105.

Figure 2C:
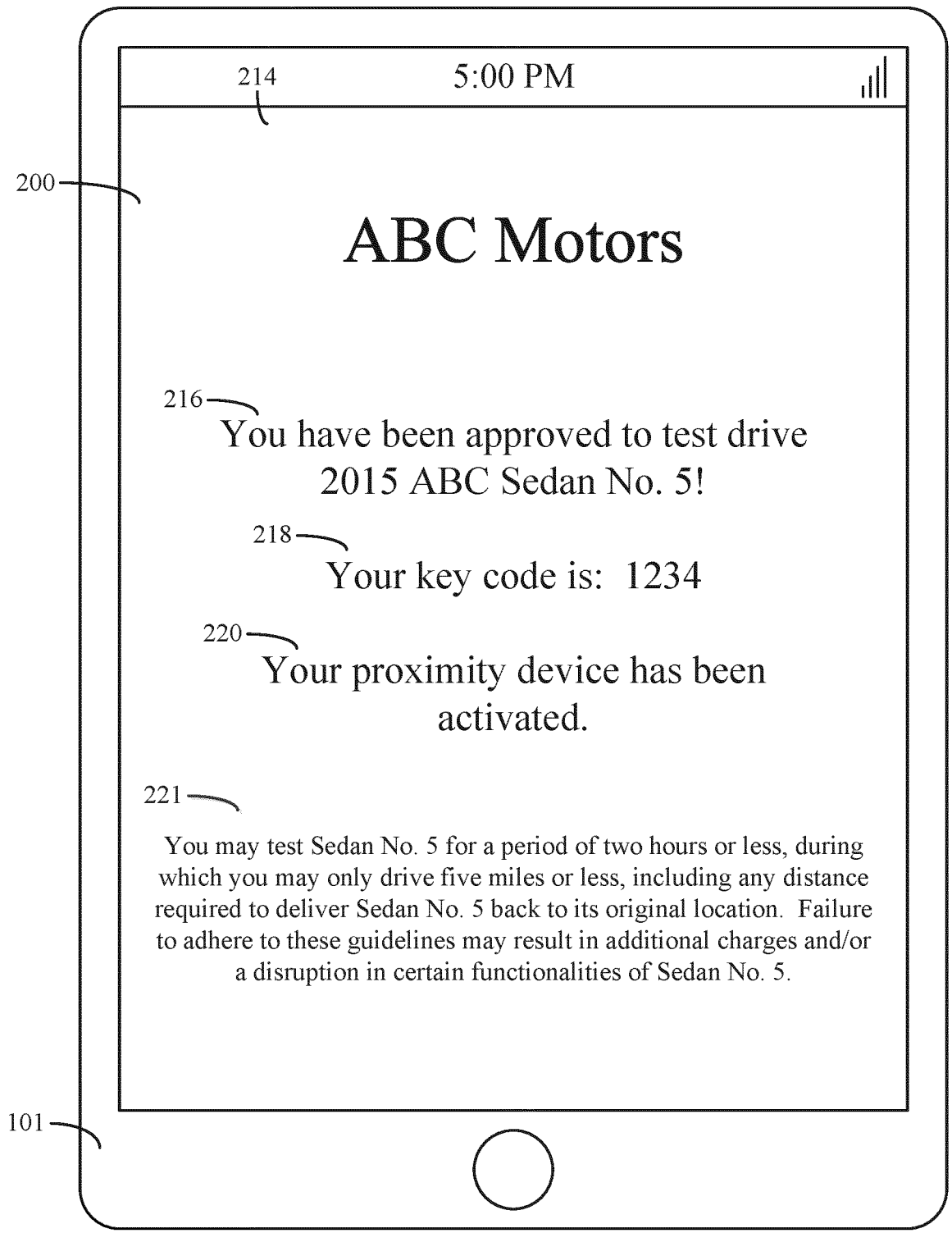

Referring now to FIG. 2C, the user interface 200 of FIG. 2B has been updated after the user has identified a desired vehicle for testing to display an approval page 214. After the customer selected a vehicle, the financial institution computing system 105 accessed information stored in a customer database 112 and a vendor database 114, and generated a financial assessment (e.g., as discussed with respect to FIG. 1A, above). The customer's testing request and the financial assessment was sent to a testable good transaction computing system 133, where a transaction logic 136 accessed a testable good database 138 and determined whether the customer's testing request is approved, and whether the vehicle is available.

If the selected vehicle is available and the transaction logic 136 approves the testing request, the user interface 200 will display the approval page 214. Included on the approval page 214 is a notification to the customer that the testing request has been approved 216. Also included on the approval page is an enabled mobile key 104 in the form of a numeric key code 218. Further included on the approval page is a notification 220 that a proximity-based mobile key 104 (e.g., via Bluetooth™ or NFC, or similar technologies) in the mobile device 101 has been enabled. Finally, also included is a warning 221 that discloses the terms of the approved testing period, and indicates the security measures that are in place during the testing period (e.g., additional charges, and remote regulation of features of the good). At this point, the customer can use the enabled mobile keys 104 to access the identified testable good and/or related security stations. In some arrangements, the customer can walk up to the vehicle, hold the mobile device 101 up to a NFC receiver, enter the vehicle, and begin a test drive. In other arrangements, the customer can walk up to a security station 119, enter the numeric key code 218 on a keypad at the security station, gain access to the vehicle's physical keys, and then begin a test drive.

Figure 2D:
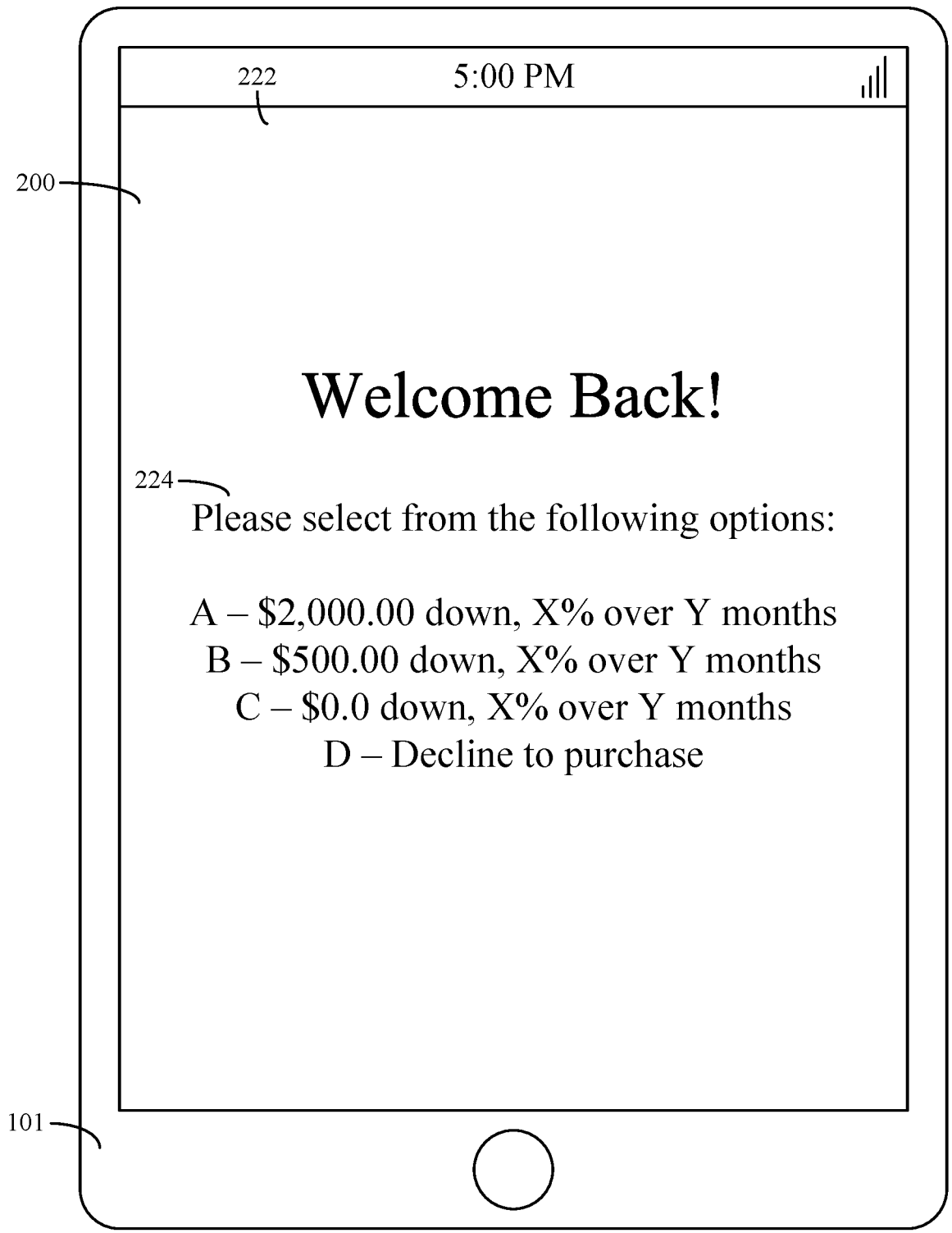

Referring now to FIG. 2D, the user interface 200 of FIG. 2C has been updated after the user finishes testing the identified vehicle to display a purchase page 222. Here the user interface 200 presents the customer with information regarding the available transaction packages 224 that the customer's financial institution has prepared for the identified vehicle, and the option to decline to purchase. The available options are based on the customer's financial information considered by the financial institution computing system 105 in preparing a financial assessment. If the customer selects one of the purchasing options, the mobile application 102 sends the selected purchase option to the financial institution computing system 105 over the network 106, which will cause the selected transaction package to be executed.

Figure 2E:
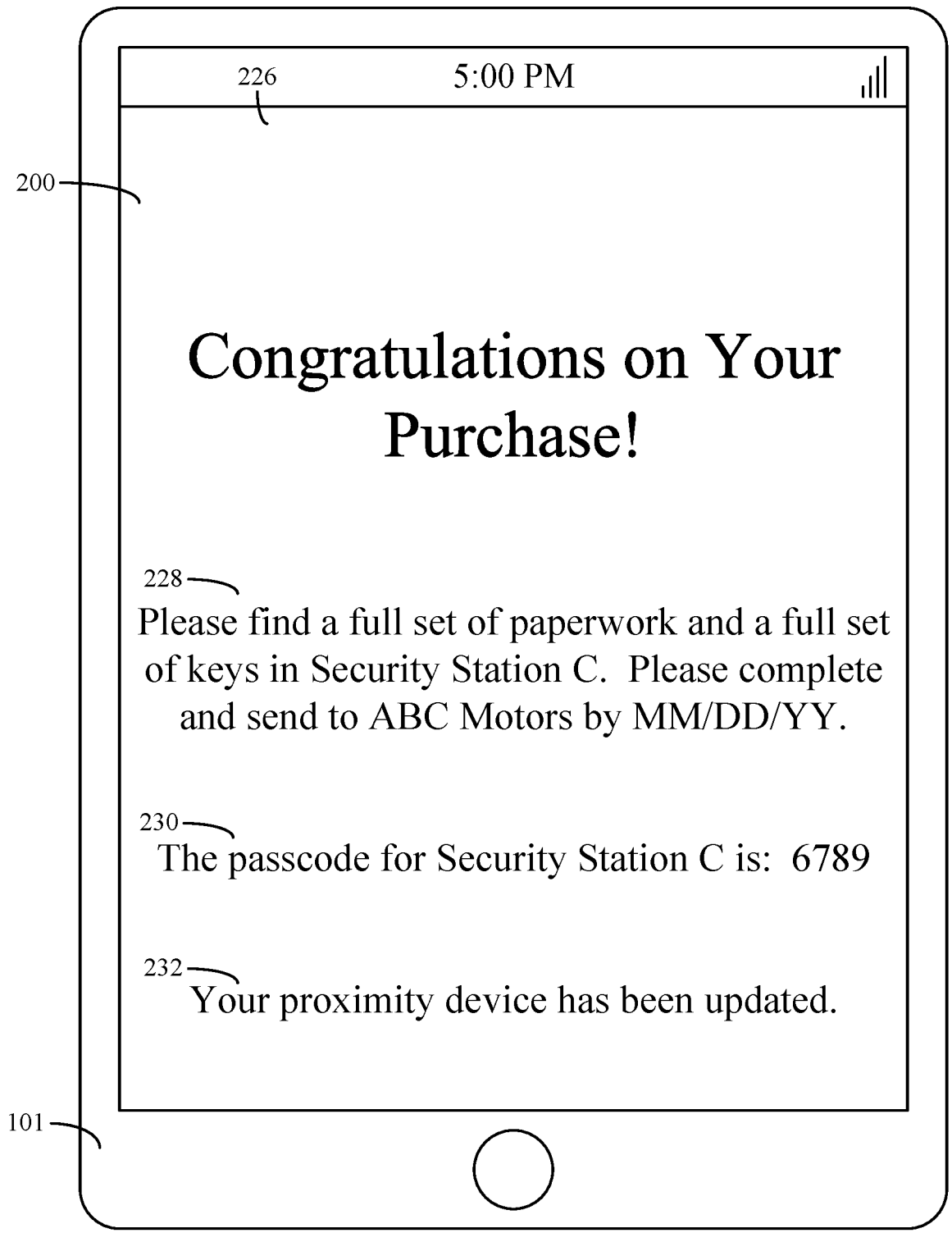

Referring now to FIG. 2E, the user interface 200 of FIG. 2D has been updated after the user has selected one of the available transaction packages to display a confirmation page 226. Included in the confirmation page is information relating to the required steps to complete the purchase 228. Here, the customer is to locate Security Station C in order to obtain a full set of keys to the purchased vehicle, and paperwork relating to the purchase. Also included in the confirmation page 226 are enabled mobile keys 104 to the security station, in the form of a numeric key code 230 and a notification that the mobile device's 101 proximity-based mobile key has been enabled 232. The customer can then locate Security Station C, disable the security device 122, and collect the paperwork and vehicle keys.

In some embodiments, once the customer is approved to take the vehicle for a test drive, an insurance company is contacted and the customer is provided with short term auto insurance for purposes of the test drive. For example, a search of the transactions records associated with the customer's accounts at the financial institution may be performed. Based on the search, the automobile insurance company utilized by the customer may be identified (e.g., based on bill pay history), and the insurance company may be contacted with a request to provide short term car insurance for the customer (e.g., for a nominal fee). If the customer then ultimately purchases the vehicle, the insurance company may then be electronically notified of the new vehicle purchase, such that the customer's account records with the insurance company may be updated to provide coverage for the newly purchased vehicle. As another example, rather than contact the customer's existing insurance, another automobile insurance vendor may be contacted, e.g., solely for the purpose of providing short term auto insurance for purposes of the test drive.

Figure 3:
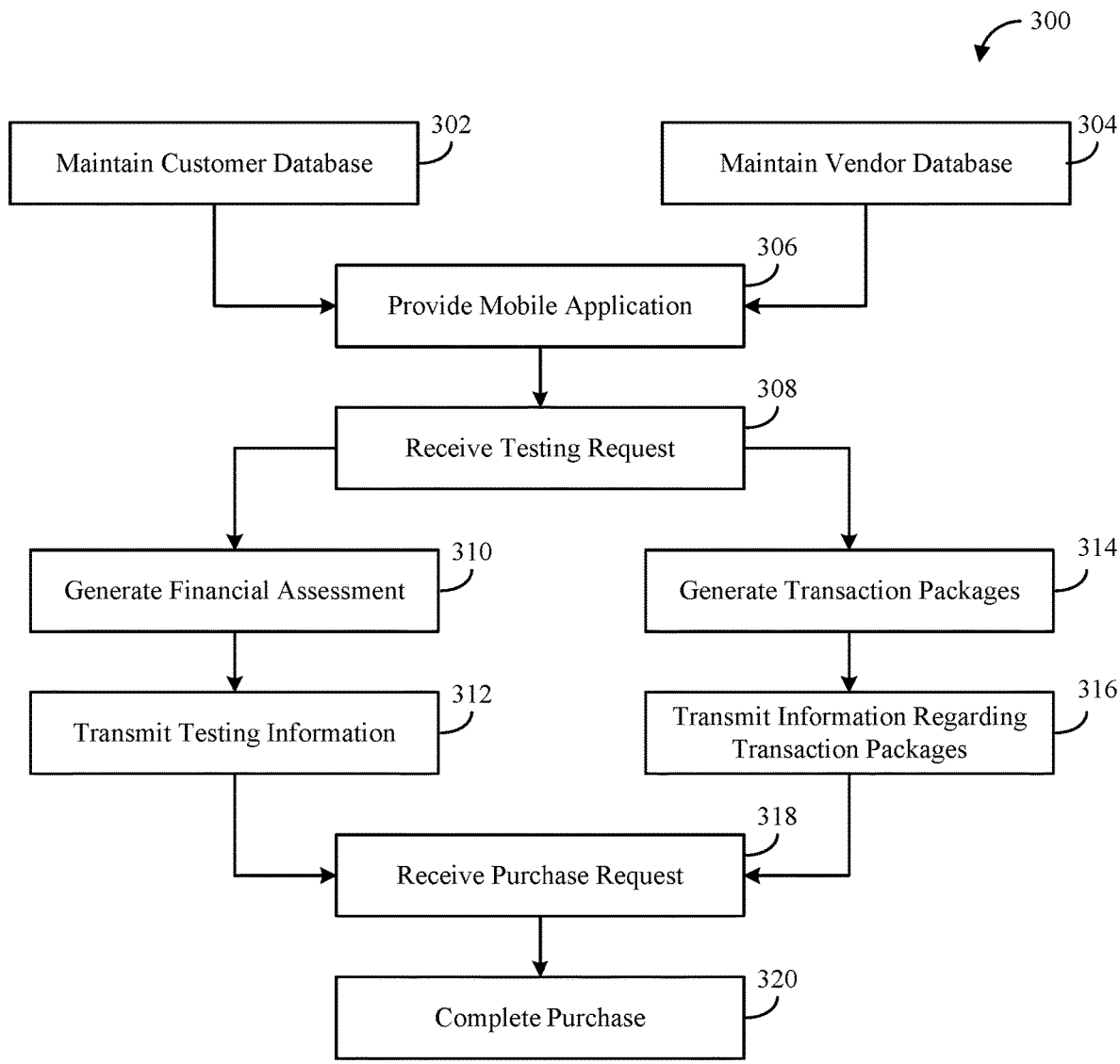
FIG. 3 is a flow diagram of a method of processing customer testing and purchasing requests according to an example embodiment.

Referring now to FIG. 3, a flow diagram of a method 300 of providing for the testing of internet-enabled goods is shown according to an example embodiment. The method 300 is performed by a computing system or a network of computing systems associated with a financial institution (e.g., financial institution computing system 105), which provides an assessment and payment system that helps customers to identify, access and/or test, and ultimately purchase, consumer goods. As discussed above with respect to the systems discussed with respect to the embodiments shown in FIGS. 1A through 1C, and in further detail below with respect to method 300, the computing system remotely enables customers to identify and access a plurality of secured customer goods, and also facilitates monetary transactions to allow customers to purchase and take possession of those secured customer goods.

A customer database is maintained (302). A financial institution computing system maintains the customer database (e.g., customer database 112), which contains information relating to a plurality of customers, for example, personal customer information (e.g., names, addresses, phone numbers, and so on) and customers' financial information (e.g., associated financial institutions, account numbers, account balances, credit assessments, and so on).

A vendor database is maintained (304). The vendor database (e.g., vendor database 114) can be maintained by the same financial institution computing system that maintains the customer database. The vendor database is maintained to contain information relating to a plurality of vendors, including testing approval criteria as discussed with respect to the vendor database 114 of FIGS. 1A through 1C, above. In some arrangements, the vendor database is maintained such that vendor information is requested, received, and transiently stored while a customer testing request is processed. In other arrangements, the vendor database is maintained such that vendor information is collected, catalogued, and stored over a longer period of time.

As the customer database and the vendor databases are maintained at 302 and 304, a mobile application is provided (306). A mobile application (e.g., mobile application 102) is provided by a financial institution to its customers. Mobile applications are software programs intended to be operated on mobile devices such as smartphones, tablets, and PDAs (e.g., customer mobile device 101). The mobile application can be provided in the form of an "app", and can be distributed to customers through third party vendors such as the Apple App Store™ or Google Play™. Alternatively, the mobile application is provided as a "mobile" version of a financial institution's website accessed through web browsers of the customers' mobile devices. The mobile application provides an interface for the financial institution and a customer to exchange information over a data network (e.g., network 106) using the customer's mobile device (e.g., customer mobile device 101). Among various features, the mobile application allows customers to identify and request the testing of various testable goods.

The provided mobile application is designed to provide information relating to a plurality of testable goods that are available from a plurality of vendors to a customer of a financial institution. In some arrangements, the mobile application is configured to provide a customer with the ability to search for and download databases of catalogued information relating to the testable goods available from a given vendor. In some of these arrangements, the databases are available as vendor-specific plugins or updates to the mobile application. In other arrangements, a large database containing catalogues of testable goods available from a plurality of vendors is included with the mobile application. In yet other arrangements, the mobile application is configured to exchange information with a computing system associated with a specific vendor, thereby allowing the customer to access a database of testable goods at a vendor's computing system.

The provided mobile application is also designed to exchange information between a mobile device on which it is installed (e.g., mobile device 101), and a financial institution computing system (e.g., financial institution computing system 105). The mobile application can be designed to transmit a testing request to a financial institution computing system, which can include information relating the customer's identity, the desired testable good, and the vendor providing the testable good. The mobile application can also be designed to receive and present to a customer a plurality of transaction packages for the testable good identified in a testing request, which can be prepared by the financial institution computing system. The mobile application can further be designed to receive and present information to the customer relating to the availability of a desired testable good, and any mobile keys or local keys corresponding to the testable good. Even further, the mobile application can be designed to allow a customer to select and authorize a transaction package prepared by the financial institution computing system.

The provided mobile application can be designed to cause a mobile device on which it is installed to wirelessly transmit or receive local signals. For example, the mobile application can cause the mobile device to use a built-in camera to scan a bar code or a QR code, which can subsequently be translated by the mobile device to identify a testable good. As another example, the mobile application can cause the mobile device to detect a NFC signal associated with a testable good. As yet another example, the mobile application can cause the mobile device to wirelessly send signals via a wireless data network (e.g., cellular networks, or wireless internet-based networks, or the like) or via a Bluetooth™ connection. As such, the mobile application can cause the mobile device to wirelessly send or receive signals and messages on a local level.

After the mobile application is provided at 306, a testing request is received (308). The testing request is received at a financial institution computing system over a network (e.g., network 106) via a network interface logic (e.g., first network interface logic 108). The testing request received was prepared and sent by the mobile application that was previously provided, and can include information sufficient to identify a customer at the financial institution, a testable good identified by the customer for testing, and a vendor associated with the testable good.

A financial assessment is generated (310). The financial assessment is the result of a series of checks and financial analyses relating to the customer, and is prepared by the financial institution computing system (e.g., by an assessment logic 110). The financial institution computing system draws and analyzes information regarding the customer from a local database, including, for example, the customer's credit history, payment history and habits, available credit, credit score, debt-to-income ratio, and so on. The financial computing system also draws and analyzes information regarding the vendor corresponding to the customer's identified testable good (e.g., by accessing another local database, or accessing a remote database associated with the vendor) to determine the vendor's testing criteria. The financial assessment can result from an analysis of the customer's financial information in light of the vendor's testing criteria.

After the financial assessment is generated at 310, testing information is transmitted (312). Testing information includes the generated financial assessment and the customer's testing request. The testing information is transmitted by a financial institution computing system over a network (e.g., over a network 106 via a first network interface logic 108) to a computing system associated with the vendor providing the identified testable good (e.g., testable good transaction computing system 133).

Transaction packages are generated (314). Transaction packages are purchasing options available for the testable good and the customer identified in the testing request received. The transaction packages can include, for example, payments in full with cash from a checking account associated with the customer, payments via a credit card associated with the customer, or mortgages or other types of financing. Transaction packages are generated by the financial institution computing system (e.g., assessment logic 110 of financial institution computing system 105), using information specific to the customer (e.g., the information used to generate the financial assessment, such as the customer's account balances, credit scores, debt-to-income ratio, and so on).

After the transaction packages are generated at 314, information regarding the transaction packages are transmitted (316). The information regarding the transaction packages include, for example, the types of transaction packages available (e.g., a cash purchase, two loans, or a credit card charge), and significant terms for each type of transaction (e.g., a debit from customer checking account A, a loan B at 3% interest over 5 years, a loan C at 6% interest over 10 years, or a charge to credit card D, respectively). The information is transmitted over a network (e.g., network 106) to the customer's mobile device and/or a computing system associated with the vendor of the identified testable good.

A purchase request is received by a financial institution computing system (318). A purchase request is an authorized message from a customer, sent via the provided mobile application, confirming that the customer wishes to purchase the testable good. The purchase request includes, for example, an authorization to purchase (e.g., an electronic signature, an entered PIN number associated with the customer, or the like), and a designation showing the customer's selected transaction package. The purchase is received over a network (e.g., network 106).

After the purchase request is received at 318, a purchase is completed (320). The purchase is completed by causing the customer's selected transaction package to occur, thereby resulting in a transfer of funds to the vendor. The purchase can be completed by, for example, sending a paper or electronic check to the vendor for the purchase price of the testable good, closing a loan and forwarding the loan amount to the vendor, or charging the purchase price to a credit card associated with the customer. The purchase can be further completed by transmitting a confirmation to a computing system associated with the vendor.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable or non-transitory storage media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of executable instructions or associated data structures represents examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multiprocessor systems, microprocessor-based or programmable customer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computing system comprising at least one processor and circuitry embodied in non-transitory memory storing computer-executable instructions thereon that, when executed, cause the processor to:
   execute a network interface logic configured to access and exchange data over a network;
   execute an assessment logic configured to:
      provide a mobile application accessible on a computing device of a customer, wherein the mobile application stores a non-active mobile key;
      receive, via the mobile application, a customer request to gain access to consumer purchasable property having a security device configured for contactless remote disablement via an activated mobile key; and
      generate a transaction package, the transaction package including one or more payment options for purchasing the purchasable property and payment terms for each of the one or more payment options; and
   execute a transaction logic configured to selectively grant the customer temporary access to the purchasable property in response to receiving the customer request;
   based on granting the customer temporary access to the purchasable property, activate the non-active mobile key;
   cause the mobile application to initiate a contactless transmission of the activated mobile key to the security device;
   determine that the security device has been disabled using the activated mobile key, comprising determining that a physical lock associated with the purchasable property has been unlocked; and
   in response to the determination that the security device has been disabled, present the transaction package to the customer via the mobile application.

2. The system of claim 1, wherein the transaction logic is configured to disable access to the purchasable property if a selection of a payment option for purchasing the purchasable property included in the transaction package is not received from the customer.

3. The system of claim 2, wherein the transaction logic is configured to initiate a transfer of ownership of the purchasable property to the customer in response to receiving, via the mobile application, a customer selection of a payment option for purchasing the purchasable property.

4. The system of claim 1, wherein the assessment logic is further configured to:
   identify a vendor associated with the purchasable property;
   obtain testing approval criteria for the identified vendor;
   obtain information specific to the customer;
   generate a financial assessment of the customer based on an evaluation of the customer-specific information against the vendor testing approval criteria; and
   transmit the financial assessment to the transaction logic;
   wherein the transaction logic is configured to grant the customer temporary access to the purchasable property based on the received financial assessment.

5. The system of claim 1, wherein the security device is configured to be disabled responsive to the recognition of a mobile key by a mobile key authentication device operably associated with the security device; and
   wherein selectively granting the customer temporary access to the purchasable property includes providing, by the transaction logic and via the mobile application, a mobile key recognizable by the mobile key authentication device.

6. The system of claim 1, wherein the customer request to gain access to the purchasable property is received responsive to the customer using the computing device to scan an identifier associated with the purchasable property.

7. The system of claim 1, wherein the mobile application includes a search interface via which one or more testable goods are presented to the customer;
wherein the customer request to gain access to the purchasable property is received responsive to the customer selecting the purchasable property from one or more testable goods presented to the customer via the search interface in the mobile application.

8. The system of claim 1, wherein the assessment logic is further configured to:
generate a financial assessment of the customer based on an evaluation of a credit history and payment history of the customer; and
transmit the financial assessment to the transaction logic.

9. A computer implemented method of processing customer testing requests and purchases, the method comprising:
providing a mobile application accessible on a computing device of a customer, the mobile application configured to exchange data between the computing device of the customer and a financial institution computing system and further stores a non-active mobile key;
receiving, via the mobile application, a customer request to gain access to an item comprising consumer purchasable property having a security device configured for contactless remote disablement via an activated mobile key;
granting a customer temporary access to the item in response to receiving the customer request;
generating a transaction package, the transaction package including one or more payment options for purchasing the item and payment terms for each of the one or more payment options;
based on granting the customer temporary access to the purchasable property, activating the non-active mobile key;
causing the mobile application to initiate a contactless transmission of the activated mobile key to the security device;
determining that the security device has been disabled using the activated mobile key, comprising determining that a physical lock associated with the purchasable property has been unlocked; and
in response to determining that the security device has been disabled, present the transaction package to the customer via the mobile application.

10. The method of claim 9, wherein access to the item is disabled if a selection of a payment option for purchasing the item included in the transaction package is not received from the customer.

11. The method of claim 10, wherein a transfer of ownership of the item to the customer is initiated in response to receiving, via the mobile application, a customer selection of a payment option for purchasing the item.

12. The method of claim 9, further comprising:
identifying a vendor associated with the item;
obtaining testing approval criteria for the identified vendor;
obtaining information specific to the customer; and
generating a financial assessment of the customer based on an evaluation of the customer-specific information against the vendor testing approval criteria;
wherein temporary access to the item is granted based on the financial assessment.

13. The method of claim 9, wherein the security device is configured to be disabled responsive to the recognition of a mobile key by a mobile key authentication device operably associated with the security device; and
wherein selectively granting the customer temporary access to the item includes providing, via the mobile application, a mobile key recognizable by the mobile key authentication device.

14. The method of claim 9, wherein the customer request to gain access to the item is received responsive to the customer using the computing device to scan an identifier associated with the item.

15. The method of claim 9, wherein the mobile application includes a search interface via which one or more testable goods are presented to the customer;
wherein the customer request to gain access to the item is received responsive to the customer selecting the item from one or more testable goods presented to the customer via the search interface in the mobile application.

16. A system for processing customer testing requests and purchases, the system comprising:
a testable good;
a security device operably secured to the testable good, the security device configured to provide a consumer selective access to the testable good based on a contactless remote disablement via an activated mobile key; and
a controller for selectively disabling the security device, the controller configured to:
receive, from a mobile application provided on a computing device of a customer, a customer request to gain access to the testable good;
in response to receiving the customer request, selectively grant the customer temporary access to the testable good;
generate a transaction package, the transaction package including one or more payment options for purchasing the testable good and payment terms for each of the one or more payment options;
based on granting the customer temporary access to the purchasable property, activate a non-active mobile key stored on the computing device of the customer;
determine that the security device has been disabled using the activated mobile key, comprising determining that a physical lock associated with the purchasable property has been unlocked; and
in response to the determination that the security device has been disabled, display, via a mobile application on a computing device of the consumer, the transaction package.

17. The system of claim 16, wherein the controller is configured to disable access to the testable good if a selection of a payment option for purchasing the testable good included in the transaction package is not received from the customer.

18. The system of claim 17, wherein the controller is configured to initiate a transfer of ownership of the testable good to the customer in response to receiving, via the mobile application, a customer selection of a payment option for purchasing the testable good.

19. The system of claim 16, wherein the controller is further configured to:
identify a vendor associated with the testable good;
obtain testing approval criteria for the identified vendor;
obtain information specific to the customer; and generate a financial assessment of the customer based on an evaluation of the customer-specific information against the vendor testing approval criteria;

wherein the controller is configured to grant the customer temporary access to the testable good based on the received financial assessment.

20. The system of claim 16, further comprising a mobile key authentication device operably associated with the security device, the mobile key authentication device configured to disable the security device in response to recognizing a mobile key;

wherein selectively granting the customer temporary access to the testable good includes providing, by the controller and via the mobile application, a mobile key recognizable by the mobile key authentication device.

21. The system of claim 16, wherein the mobile application includes a search interface via which one or more available goods are presented to the customer;

wherein the customer request to gain access to the testable good is received responsive to the customer selecting the testable good from one or more available goods presented to the customer via the search interface in the mobile application.

* * * * *